(12) United States Patent
Sugawara

(10) Patent No.: US 9,624,999 B2
(45) Date of Patent: *Apr. 18, 2017

(54) VIBRATION ABSORPTION DEVICE

(75) Inventor: Hideki Sugawara, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1204 days.

This patent is subject to a terminal disclaimer.

(21) Appl. No.: 13/266,344

(22) PCT Filed: Apr. 27, 2010

(86) PCT No.: PCT/JP2010/057493
§ 371 (c)(1),
(2), (4) Date: Dec. 19, 2011

(87) PCT Pub. No.: WO2010/126058
PCT Pub. Date: Nov. 4, 2010

(65) Prior Publication Data
US 2012/0080829 A1   Apr. 5, 2012

(30) Foreign Application Priority Data

Apr. 27, 2009  (JP) ................................ 2009-108314

(51) Int. Cl.
*F16F 5/00* (2006.01)
*F16F 13/10* (2006.01)

(52) U.S. Cl.
CPC .................................. *F16F 13/105* (2013.01)

(58) Field of Classification Search
CPC ......... F16F 13/10; F16F 13/105; F16F 13/107
(Continued)

(56) References Cited

U.S. PATENT DOCUMENTS 5,259,598 A * 11/1993 Hibi et al. ............... 267/140.13
5,775,666 A *  7/1998 Tsukamoto et al. ..... 267/140.13
(Continued)

FOREIGN PATENT DOCUMENTS

JP       8-014317 A    1/1996
JP       8-128491 A    5/1996
(Continued)

OTHER PUBLICATIONS

International Search Report of PCT/JP2010/057493, dated May 25, 2010.
Japanese Office Action, dated Dec. 11, 2012, issued in corresponding Japanese Application No. 2009-108314.

*Primary Examiner* — Robert A Siconolfi
*Assistant Examiner* — Mahbubur Rashid
(74) *Attorney, Agent, or Firm* — Sughrue Mion, PLLC

(57) ABSTRACT

A floor portion (34) is formed to be inflected to a radial direction inner side from a lower end portion of a channel outer tube portion (32), and is disposed apart from and opposing a flange portion (24) at an outer periphery side of a tube portion (22) of a dividing member (20). The floor portion (34) is disposed within the tube portion (22) in an axial direction S, that is, so as to overlap with the tube portion (22) when viewed from a radial direction. A diaphragm (50) in the form of an elastic film is adhered by vulcanization to a restriction channel member (30) so as to cover an aperture in a lower side of the restriction channel member (30). A seal portion (56) is vulcanization-formed integrally with the diaphragm (50), so as to cover an inner periphery face of a channel inner tube portion (36) of the restriction channel member (30).

7 Claims, 5 Drawing Sheets

(58) Field of Classification Search
USPC .... 267/140.11, 140.13, 140.14, 140.15, 292, 267/293
See application file for complete search history.

(56) References Cited

U.S. PATENT DOCUMENTS

| | | | |
|---|---|---|---|
| 6,390,458 B2* | 5/2002 | Okanaka et al. | 267/140.11 |
| 6,799,753 B2* | 10/2004 | Okanaka et al. | 267/140.13 |
| 7,100,910 B2* | 9/2006 | Okanaka et al. | 267/140.13 |
| 2001/0019099 A1* | 9/2001 | Okanaka et al. | 248/562 |
| 2002/0195757 A1* | 12/2002 | Kodama et al. | 267/140.11 |
| 2007/0057421 A1* | 3/2007 | Nanno et al. | 267/140.13 |
| 2007/0075470 A1* | 4/2007 | Happou et al. | 267/140.13 |

FOREIGN PATENT DOCUMENTS

| | | |
|---|---|---|
| JP | 10-54438 A | 2/1998 |
| JP | 2001-234968 A | 8/2001 |
| JP | 2004-003634 A | 1/2004 |
| JP | 2004-204964 A | 7/2004 |
| JP | 2005-221080 A | 8/2005 |
| JP | 2006-090388 A | 4/2006 |
| JP | 2008-267453 A | 11/2008 |
| JP | 2009-058099 A | 3/2009 |
| JP | 2009-085344 A | 4/2009 |
| WO | WO 2004081408 A1 * | 9/2004 |
| WO | WO 2009123351 A1 * | 10/2009 |

* cited by examiner

VIBRATION ABSORPTION DEVICE

CROSS REFERENCE TO RELATED APPLICATION

This application is a National Stage of International Application No. PCT/JP2010/057493 filed Apr. 27, 2010, claiming priority based on Japanese Patent Application No. 2009-108314, filed Apr. 27, 2009, the contents of all of which are incorporated herein by reference in their entirety.

TECHNICAL FIELD

The present invention relates to a vibration absorption device that is to be used as an engine mount for general industrial machinery or an automobile or the like and that absorbs and damps vibrations transmitted from a vibration generating portion such as an engine or the like to a vibration receiving portion such as a vehicle body or the like.

BACKGROUND ART

A vibration absorption device that serves as an engine mount is provided between, for example, an engine of a vehicle that acts as a vibration generating portion and a vehicle body that acts as a vibration receiving portion. The vibration absorption device absorbs vibrations produced by the engine and suppresses transmission of the vibrations to the vehicle body side. A sealed fluid-type vibration absorption device is known as this kind of vibration device. In a sealed fluid-type vibration absorption device, an elastic body and a pair of liquid chambers are provided inside the device, and the pair of chambers are in fluid communication with one another through a restriction channel. According to this sealed fluid-type vibration absorption device, when an engine mounted thereon operates and produces vibrations, the vibrations are absorbed by a damping function of the elastic body, viscous resistance of a liquid in an orifice communicating between the pair of chambers and suchlike, and transmission of the vibrations to the vehicle body side is suppressed.

Sealed fluid-type vibration absorption devices as described above include, for example, those illustrated in Patent References 1 to 5. In each of the vibration absorption devices recited in Patent References 1 to 5, a liquid chamber is divided by a dividing member into a primary chamber and a secondary chamber, and the primary chamber and the secondary chamber are put into fluid communication by a restriction channel structured at an outer periphery of the dividing member.

Now, if the restriction channel is structured at an outer side of the dividing member, between the dividing member and a restriction channel member that is a separate member from the dividing member, a diaphragm may be adhered directly to the restriction channel member by vulcanization or the like. In such a case, assurance of sealing between the dividing member and the restriction channel member and diaphragm is required.

Patent Reference 1: Japanese Patent Application Laid-Open (JP-A) No. 2006-90388

Patent Reference 2: JP-A No. 2004-204964

Patent Reference 3: JP-A No. 2005-221080

Patent Reference 4: JP-A No. H8-14317

Patent Reference 5: JP-A No. 2004-3634

DISCLOSURE OF INVENTION

Technical Problem

The present invention has been made in consideration of the situation described above, and an object of the present invention is to provide a vibration absorption device capable of assuring sealing between a dividing member and a restriction channel member and diaphragm.

Solution to Problem

In order to achieve the object described above, a vibration absorption device relating to a first aspect of the invention includes: a first mounting member that is coupled to one of a vibration generating portion or a vibration receiving portion; a second mounting member that is tubular and is coupled to the other of the vibration generating portion or the vibration receiving portion; an elastic body that is disposed between the first mounting member and the second mounting member and is coupled to both the mounting members; a primary chamber constituted at an inner side of the second mounting member, the elastic body serving as a portion of a dividing wall of the primary chamber, and liquid being sealed in the primary chamber; a secondary chamber in which liquid is sealed, at least a portion of a dividing wall of the secondary chamber being formed by a diaphragm, and the secondary chamber being capable of expanding and contracting; a dividing member that divides the primary chamber from the secondary chamber, the dividing member including a tubular tube portion, a flange portion that is structured to extend to a radial direction outer side from the primary chamber side end of the tube portion, an outer periphery of the flange portion being disposed along an inner periphery of the second mounting member, and a movable elastic film that is disposed at the radial direction inner side of the tube portion; and a restriction channel member that is an annular body separate from the dividing member, that is disposed between the tube portion of the dividing member and the second mounting member, that includes a floor portion that is disposed apart from and opposing the flange portion and disposed within the outer periphery side of the tube portion in a tube axial direction, and that structures a restriction channel between the dividing member and the restriction channel member, the restriction channel causing fluid communication between the primary chamber and the secondary chamber, and an outer periphery end of the diaphragm being adhered to at least an inner periphery of the floor portion, wherein an aperture is formed in a circumferential direction portion of the floor portion of the restriction channel member, the aperture causing fluid communication with the secondary chamber, and, at a position corresponding with the aperture, the diaphragm is adhered to the restriction channel member at the radial direction outer side relative to the aperture.

In a vibration absorption device with the structure described above, the restriction channel member is a separate body from the dividing member, and the restriction channel that communicates between the primary chamber and the secondary chamber is formed between the dividing member and the restriction channel member. At least the outer periphery end of the diaphragm structuring the secondary chamber is adhered to the inner periphery of the floor portion, and the restriction channel is put into fluid communication with the secondary chamber via the aperture formed in the floor portion of the restriction channel member. The floor portion of the restriction channel member is disposed within the tube portion in the tube axial direction. Thus, by the restriction channel member to which the outer periphery end of the diaphragm is adhered being crimped to the radial direction inner side, sealing may be reliably implemented between the inner periphery side of the floor portion and the tube portion outer periphery of the dividing member.

In a vibration absorption device relating to a second aspect of the invention, at the restriction channel member, a channel outer tube portion that is apart from and opposes a tube portion outer face of the dividing member is structured to be continuous from an outer periphery end of the floor portion.

According to the above structure, the restriction channel is structured by a cavity enclosed by the floor portion and communication outer tube portion of the restriction channel member and the tube portion and flange portion of the dividing member.

In a vibration absorption device relating to a third aspect of the invention, at the restriction channel member, a channel inner tube portion that is disposed along the tube portion outer face of the dividing member is structured to be continuous from an inner periphery end of the floor portion.

According to the above structure, sealing with the tube portion outer face of the dividing member may be implemented using the inner side face of the channel inner tube portion.

In a vibration absorption device relating to a fourth aspect of the invention, the channel inner tube portion is extended toward the secondary chamber side from the inner periphery end of the floor portion.

According to the above structure, sealing with the tube portion may be reliably implemented by crimping the channel inner tube portion to the radial direction inner side.

In a vibration absorption device relating to a fifth aspect of the invention, a seal portion that covers an inner wall of the channel inner tube portion is formed integrally with the diaphragm.

According to the above structure, the seal portion is formed integrally with the diaphragm and structure is simple.

In a vibration absorption device relating to a sixth aspect of the invention, the diaphragm structures the secondary chamber at the radial direction inner side relative to the inner periphery end of the floor portion, and the diaphragm is protruded to the radial direction outer side at a fluid communication position corresponding with the aperture in the floor portion.

According to the above structure, the outer periphery of the secondary chamber is formed at the radial direction inner side of the floor portion. Thus, a secondary chamber region may be structured to be compact in the radial direction.

In a vibration absorption device relating to a seventh aspect of the invention, the diaphragm is structured with a thicker thickness at the fluid communication position than at other portions of the diaphragm that structure the secondary chamber.

According to the above structure, deformation of the diaphragm at the fluid communication position by flows of the liquid may be suppressed.

Advantageous Effects of Invention

According to the present invention as described hereabove, sealing between the dividing member and the restriction channel member and diaphragm may be assured.

BEST MODE FOR CARRYING OUT THE INVENTION

Herebelow, a vibration absorption device relating to an exemplary embodiment of the present invention is described with reference to the attached drawings.

Figure 1:
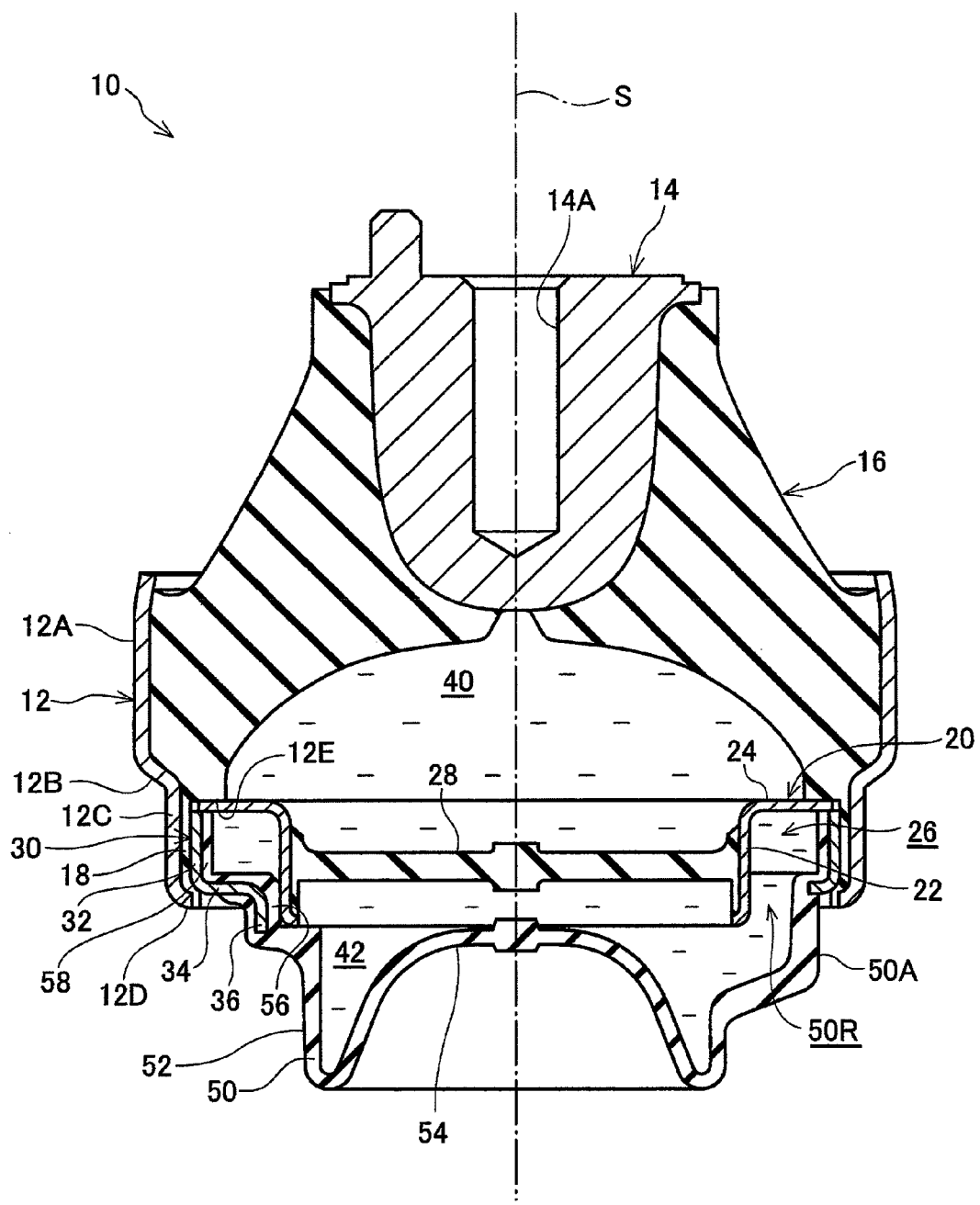
FIG. 1 is a side sectional diagram illustrating structure of a vibration absorption device relating to an exemplary embodiment of the present invention.

A vibration absorption device 10 relating to the exemplary embodiment of the present invention is illustrated in FIG. 1. This vibration absorption device 10 is employed in an automobile as an engine mount that supports an engine, which is a vibration generating portion, at a vehicle body, which is a vibration receiving portion. The label S in the drawings indicates a central axis, a direction along this central axis is an axial direction S of the device, and descriptions are given hereinafter with an up-down direction in the drawings being an up-down direction of the vibration absorption device 10. Vibrations (primary vibrations), the absorption of which is a principal objective, are inputted in the axial direction S.

As illustrated in FIG. 1, the vibration absorption device 10 is provided with a first mounting member 14 and a second mounting member 12.

The second mounting member 12 is in a substantially circular tube shape, and a step portion 12B is formed at an intermediate portion thereof. Sandwiching the step portion 12B, the upper side of the second mounting member 12 serves as an elastic body coupling portion 12A, and the lower side serves as a division nipping portion 12C with a smaller diameter than the elastic body coupling portion 12A. A crimping portion 12D that is crimped to the radial direction inner side is formed at a lower end portion of the division nipping portion 12C. The second mounting member 12 is coupled to the vehicle body via an unillustrated bracket.

The first mounting member 14 is in a substantially circular rod shape with a smaller diameter than the second mounting member 12. A threaded hole 14A, in which a female thread is formed, is formed toward the axial direction lower side from a central region of an upper face of the first mounting member 14. An unillustrated bolt that is coupled to the engine side is threaded into the threaded hole 14A.

A lower portion of the first mounting member 14 is disposed at the inner side of the second mounting member 12 so as to be coaxial with the second mounting member 12. The central axes of the first mounting member 14 and the second mounting member 12 are on the axial direction S of the vibration absorption device 10.

An elastic body 16 made of rubber, which serves as a vibration-absorbing main body, is disposed between the first mounting member 14 and the second mounting member 12. The elastic body 16 is adhered by vulcanization to the outer face of the first mounting member 14 and is adhered by vulcanization to the elastic body coupling portion 12A and step portion 12B of the second mounting member 12. Thus, the first mounting member 14 and the second mounting member 12 are elastically coupled.

A cover portion 18 in the form of a thin film is integrally formed at the elastic body 16, protruding downward from a lower end portion thereof. The cover portion 18 is adhered by vulcanization to the inner periphery face of the division nipping portion 12C of the second mounting member 12, and covers the inner wall of the second mounting member 12. A step portion 12E is formed at the lower side of a portion of the cover portion 18 that corresponds with the step portion 12B. A flange portion 24 of a dividing member 20, which is described below, is abutted against this step portion 12E.

Figure 2:
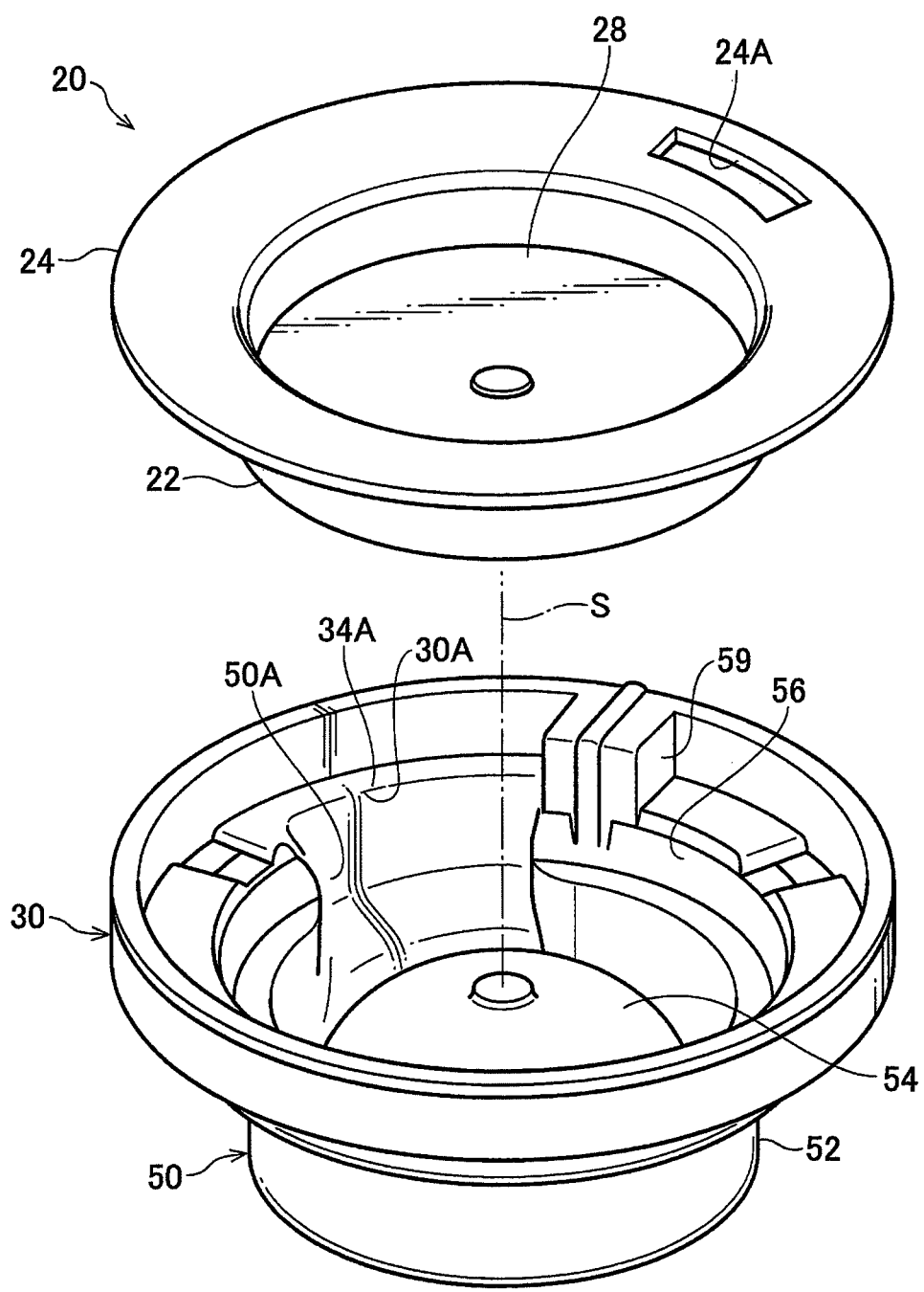
FIG. 2 is a perspective diagram illustrating structure of a dividing member, restriction channel member and diaphragm of the vibration absorption device relating to the exemplary embodiment of the present invention.

The dividing member 20 and a restriction channel member 30 are disposed at the inner periphery side of the cover portion 18. The dividing member 20 and the restriction channel member 30 are fixed by the division nipping portion 12C and the lower end portion 12D being crimped to the radial direction inner side. As illustrated in FIG. 2, the dividing member 20 is formed in a hat shape, provided with a tube portion 22, the flange portion 24 and a movable elastic film 28.

The tube portion 22 has a circular tube shape, and the flange portion 24 is structured to extend to the radial direction outer side from an upper end portion of the tube portion 22. An outer periphery end of the flange portion 24 abuts against the step portion 12E, and is thus positioned in the axial direction S. A fluid communication hole 24A that communicates between a primary chamber 40 and a restriction channel 26, which are described below, is formed in the flange portion 24.

The movable elastic film 28 is disposed at the radial direction inner side of the tube portion 22. The movable elastic film 28 is in a circular plate shape and is elastically deformable. The movable elastic film 28 is adhered to the inner wall of the tube portion 22 so as to divide the interior of the tube portion 22 between above and below. The movable elastic film 28 is structured by an elastically deformable film of a rubber, a resin or the like.

The primary chamber 40 is constituted at the inner side, enclosed by a lower face of the elastic body 16 and an upper face of the dividing member 20. A liquid is sealed in the primary chamber 40. Water, oil, ethylene glycol or the like may be used as the liquid.

Figure 3:
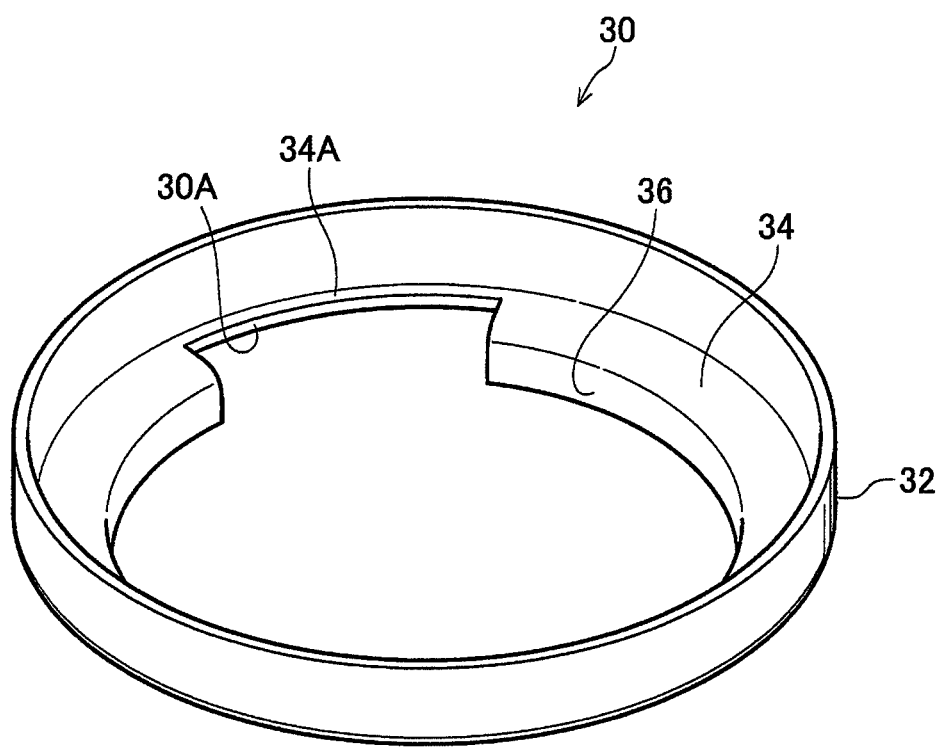
FIG. 3 is a perspective diagram illustrating structure of the restriction channel member of the vibration absorption device relating to the exemplary embodiment of the present invention.

As illustrated in FIG. 2 and FIG. 3, the restriction channel member 30 is formed as a separate member from the dividing member 20. The restriction channel member 30 has an annular shape, and is provided with a channel outer tube portion 32, a floor portion 34 and a channel inner tube portion 36.

The channel outer tube portion 32 has a circular tube shape whose outer diameter is a little smaller than the division nipping portion 12C, and is disposed at the inner periphery side of the division nipping portion 12C. As illustrated in FIG. 1, the channel outer tube portion 32 is disposed apart from and opposing the outer periphery face of the tube portion 22 of the dividing member 20, and is pressed against the inner periphery face of the division nipping portion 12C with the cover portion 18 therebetween.

The floor portion 34 is formed to be inflected to the radial direction inner side from a lower end portion of the channel outer tube portion 32, and is disposed apart from and opposing the flange portion 24 at the outer periphery side of the tube portion 22 of the dividing member 20. The floor portion 34 is disposed within the tube portion 22 in the axial direction S, that is, so as to overlap with the tube portion 22 when viewed from a radial direction.

The channel inner tube portion 36 is formed to be inflected to the downward direction from an inner periphery portion of the floor portion 34, and is disposed along the tube portion 22 of the dividing member 20. A lower end portion of the channel inner tube portion 36 protrudes further downward than a lower end portion of the second mounting member 12.

The restriction channel 26, which communicates between the primary chamber 40 and a secondary chamber 42, which is described below, is constituted to be enclosed by the inner periphery face of the channel outer tube portion 32, the upper face of the floor portion 34, the lower face of the flange portion 24 and the outer periphery face of the tube portion 22.

As illustrated in FIG. 3, a fluid communication aperture 30A is formed in the restriction channel member 30 at a portion of the circumferential direction thereof. The fluid communication aperture 30A is formed by a circumferential direction portion of the channel inner tube portion 36 and a circumferential direction portion of the floor portion 34 being cut away. At the region at which the floor portion 34 is cut away, a reinforcement portion 34A is retained at the radial direction outer side for crimping.

A diaphragm 50 in the form of an elastic film is adhered by vulcanization to the restriction channel member 30 so as to cover a lower side opening thereof. A seal portion 56 is vulcanization-formed integrally with the diaphragm 50 so as to cover the radial direction inner side of the floor portion 34 and the inner periphery face of the channel inner tube portion 36 of the restriction channel member 30. An outer periphery of the diaphragm 50 is adhered to the restriction channel member 30 by the seal portion 56. An inner film portion 58 is formed integrally with the seal portion 56 and covers the inner side of the floor portion 34 and the inner side of the channel outer tube portion 32.

The diaphragm 50 is provided with a tube wall portion 52 and a movable floor portion 54. The tube wall portion 52 has a substantially circular tube shape, an upper portion end of which serves as the seal portion 56 and is adhered to the inner periphery side of the floor portion 34 of the restriction channel member 30. A region of the tube wall portion 52 that corresponds with the fluid communication aperture 30A has the form of a protrusion to the radial direction outer side, and is adhered to the outer periphery side of the floor portion 34. Thus, a fluid communication channel 50R that communicates with the below-described secondary chamber 42 is structured between the outer periphery of the tube portion 22 and the diaphragm 50.

The movable floor portion 54 has a bowl shape, an outer periphery of which is continuous with the tube wall portion 52, and is formed such that a floor portion of the bowl is oriented to the upper side in a state in which no vibration is being inputted. The movable floor portion 54 is structured integrally with the tube wall portion 52.

The secondary chamber 42 is constituted at the inner side, enclosed by the diaphragm 50 and the lower face of the dividing member 20. The secondary chamber 42 is in fluid communication with the primary chamber 40 via the fluid communication aperture 30A, the restriction channel 26 and the fluid communication hole 24A. The diaphragm 50 is structured with a thicker thickness where it is in the shape of a protrusion below the communication aperture 30A than at other portions. Hereinafter, the corresponding portion of the diaphragm 50 is referred to as a fluid communication protrusion portion 50A. Similarly to the primary chamber 40, the liquid is sealed in the secondary chamber 42.

The dividing member 20 is pushed into a cavity portion of the restriction channel member 30, with the seal portion 56 therebetween, such that the opposite side of the dividing member 20 from the side at which the flange portion 24 is provided is to the diaphragm 50 side, and such that the fluid communication aperture 30A and the fluid communication hole 24A do not overlap in the circumferential direction but are offset. The tube portion 22 of the dividing member 20 and the channel inner tube portion 36 of the restriction channel member 30 are tightly contacted by the seal portion 56. A barrier wall 59 is formed, integrally with the seal portion 56 and the inner film portion 58, between the fluid communication aperture 30A and the fluid communication hole 24A in the circumferential direction. Thus, the fluid communication hole 24A side and the fluid communication aperture 30A side of the restriction channel 26 are partitioned by the barrier wall 59.

Next, assembly of the vibration absorption device 10 relating to the present exemplary embodiment is described.

First, in an unillustrated mold, the elastic body 16 is adhered by vulcanization between the first mounting member 14 and the second mounting member 12, and the cover portion 18 is formed. Separately, using a mold, the diaphragm 50, the seal portion 56 and the inner film portion 58 are vulcanization-formed at the restriction channel member 30. In addition, the movable elastic film 28 is vulcanization-formed at the dividing member 20.

Then, assembly of the dividing member 20 with the restriction channel member 30 is implemented by pushing the dividing member 20, from the opposite side thereof from the side at which the flange portion 24 is provided, into the side of the restriction channel member 30 at which the diaphragm 50 is not formed and tightly contacting the outer periphery of the tube portion 22 and the lower face of the flange portion 24 with the inner periphery and the upper end face of the restriction channel member 30. At this time, the barrier wall 59 is disposed between the fluid communication aperture 30A of the restriction channel member 30 and the fluid communication hole 24A of the dividing member 20.

Then, the set of the first mounting member 14, the second mounting member 12 and the elastic body 16 and the set of the dividing member 20, the restriction channel member 30 and the diaphragm 50 that have been integrated as described above are assembled within the liquid that is to be sealed thereinside. In this assembly, the dividing member 20 and restriction channel member 30 are inserted from the lower side of the second mounting member 12, the outer periphery of the flange portion 24 of the dividing member 20 is engaged with the step portion 12E, and an upper end face of the channel outer tube portion 32 of the restriction channel member 30 is abutted against the lower face of the flange portion 24. Then, the crimping portion 12C and lower end portion 12D of the second mounting member 12 are crimped to the radial direction inner side. Thus, the vibration absorption device 10 may be assembled.

Next, operation of the vibration absorption device 10 relating to the present exemplary embodiment configured as described above is described.

In the vibration absorption device 10, when a vibration is inputted from the engine or vehicle body side, the elastic body 16 that is the vibration-absorbing main body is elastically deformed by the vibration, and the vibration is damped and absorbed by the elastic body 16.

In the vibration absorption device 10, the internal volume of the primary chamber 40 is expanded and contracted by the deformation of the elastic body 16, and the liquid reciprocatingly flows through the restriction channel 26 between the primary chamber 40 and the secondary chamber 42 in association with the expansions and contractions of the primary chamber 40. At this time, if a vibration in a relatively low frequency region, for example, a shake vibration or the like, is being inputted, liquid column resonance occurs, in which the liquid flows in and out between the primary chamber 40 and the secondary chamber 42 in resonance with the input vibration. In this case, the vibration energy is absorbed by pressure changes in the liquid that occur in the cavity in the restriction channel 26, viscous resistance of the liquid flows, and the like. Thus, in the vibration absorption device 10, particularly vibrations in a relatively low frequency region such as shake vibrations and the like may be effectively absorbed by liquid column resonance between the primary chamber 40 and the secondary chamber 42.

The diaphragm 50 suppresses a rise in liquid pressure inside the secondary chamber 42 by elastically deforming so as to expand to the outer side when liquid from the primary chamber 40 is inputted into the secondary chamber 42. Thus, restriction of an inflow of the liquid from inside the primary chamber 40 to inside the secondary chamber 42 due to a rise in the liquid pressure in the secondary chamber 42 may be prevented.

Alternatively, if a vibration in a relatively high frequency region is inputted from the engine, for example, an idling vibration or the like, clogging occurs in the restriction channel 26 and the vibrations may not be absorbed by liquid column resonance. At this time, the movable elastic film 28 is elastically deformed by the vibrations in the high frequency region that are transmitted to the liquid inside the primary chamber 40 so as to expand and contract the volume inside the primary chamber 40. Thus, because a rise in liquid pressure in the primary chamber 40 is suppressed, even when vibrations in a relatively high frequency range are inputted from the engine, a rise in the dynamic spring coefficient in association with a rise in liquid pressure of the liquid in the primary chamber 40 may be suppressed, and vibrations in the high frequency region too may be effectively absorbed.

In the present exemplary embodiment, because the restriction channel member 30 and the dividing member 20 are formed as separate members, the diaphragm 50 may be molded integrally with the restriction channel member 30. In the present exemplary embodiment, the diaphragm 50 is formed by vulcanization-molding of a rubber material. However, for example, the restriction channel member 30 may be formed of a resin such as polypropylene (PP) or the like, the diaphragm 50 may be formed of a thermoplastic vulcanizate (a crosslinked elastomer), and the two may be integrally structured by twin-molding.

In the present exemplary embodiment, because the floor portion 34 of the restriction channel member 30 is disposed within the tube portion 22 in the axial direction S, sealing between the inner side of the floor portion 34 and the outer periphery of the tube portion 22 by the seal portion 56 may be reliably implemented by the division nipping portion 12C of the second mounting member 12 being crimped to the radial direction inner side.

In the present exemplary embodiment, because the fluid communication channel 50R is constituted at the radial direction outer side of the dividing member 20, the dividing member 20 may be formed in a circular tube shape, the movable elastic film 28 may be formed in a circular plate shape, and a larger area may be assured.

In the present exemplary embodiment, because the outer radius of the diaphragm 50 is adhered to the inner periphery side of the restriction channel member 30 and only the portion corresponding with the fluid communication aperture 30A is formed as a protrusion to the radial direction outer side, the lower portion of the vibration absorption device 10 may have a small diameter and be made compact.

In the present exemplary embodiment, because the fluid communication protrusion portion 50A of the diaphragm 50 is made thicker than other portions of the diaphragm 50, movements of the fluid communication protrusion portion 50A when the secondary chamber 42 is expanding and contracting may be suppressed, and the sealed liquid may pass through the fluid communication channel 50R smoothly.

Figure 4:
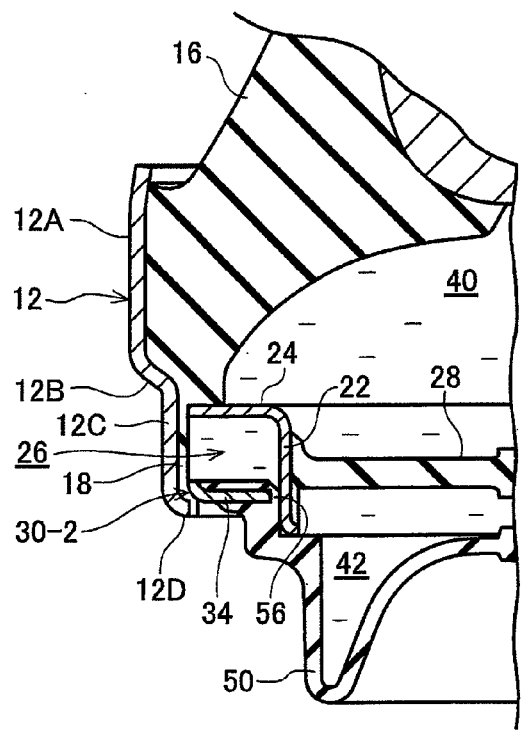
FIG. 4 is a partial sectional diagram illustrating a variant example of the restriction channel member of the vibration absorption device relating to the exemplary embodiment of the present invention.

In the present exemplary embodiment, the restriction channel member 30 includes the channel outer tube portion 32 and the channel inner tube portion 36. However, as illustrated in FIG. 4, a restriction channel member 30-2 that is formed without the channel outer tube portion 32 and the channel inner tube portion 36 may be formed.

Figure 5:
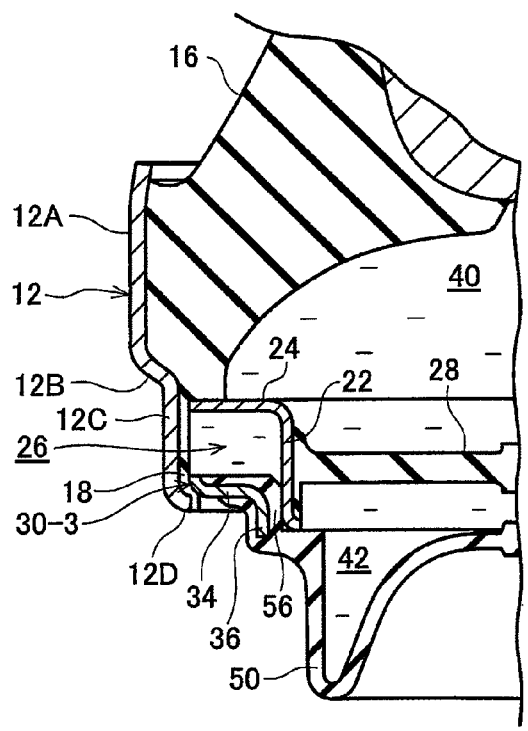
FIG. 5 is a partial sectional diagram illustrating another variant example of the restriction channel member of the vibration absorption device relating to the exemplary embodiment of the present invention.

Further, as illustrated in FIG. 5, a restriction channel member 30-3 from which the channel outer tube portion 32 of the restriction channel member 30 is omitted may be formed.

Figure 6:
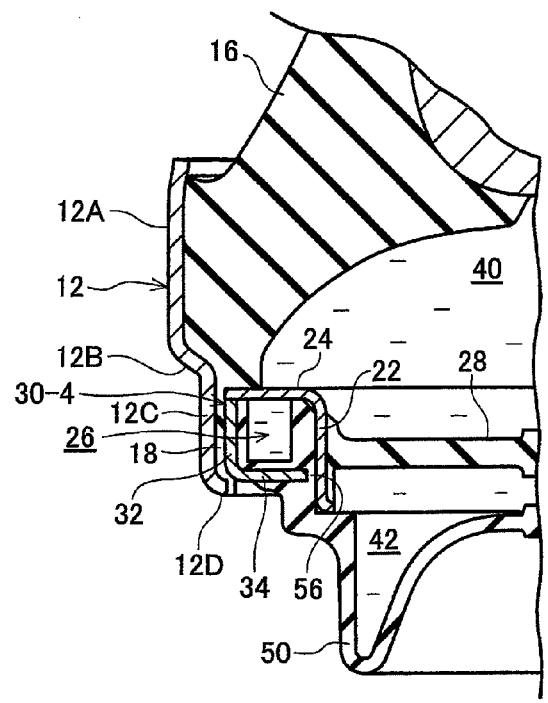
FIG. 6 is a partial sectional diagram illustrating yet another variant example of the restriction channel member of the vibration absorption device relating to the exemplary embodiment of the present invention.

Further, as illustrated in FIG. 6, a restriction channel member 30-4 from which the channel inner tube portion 36 of the restriction channel member 30 is omitted may be formed.

Figure 7:
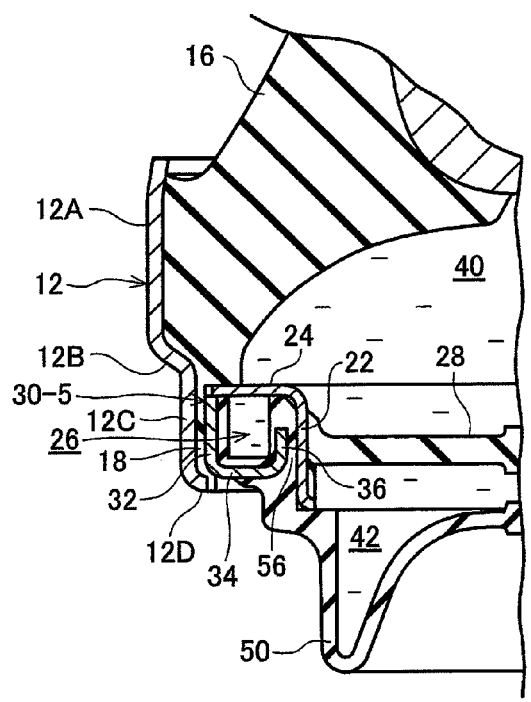
FIG. 7 is a partial sectional diagram illustrating still another variant example of the restriction channel member of the vibration absorption device relating to the exemplary embodiment of the present invention.

Further, as illustrated in FIG. 7, a restriction channel member 30-5 in which the channel inner tube portion 36 of the restriction channel member 30 is inflected to the upper side may be formed.

In particular, when the channel outer tube portion 32 is included as in the present exemplary embodiment, contact of the restriction channel member 30 with the cover portion 18 is area contact at the outer periphery of the channel outer tube portion 32, and damage to the cover portion 18 by the crimping process or the like may be suppressed.

Moreover, when the channel inner tube portion 36 is included as in the present exemplary embodiment, contact of the restriction channel member 30 with the outer face of the tube portion 22, via the seal portion 56, is area contact, and damage to the seal portion 56 by the crimping process or the like may be suppressed.

Further still, when the channel inner tube portion 36 has the structure that is inflected to the lower side as in the present exemplary embodiment, the channel inner tube portion 36 may be retained by a robot arm during assembly, and the seal portion 56 and the tube portion 22 may be more reliably sealed together.

The invention claimed is:

1. A vibration absorption device comprising:
   a first mounting member that is coupled to one of a vibration generating portion or a vibration receiving portion;
   a second mounting member that is tubular and is coupled to the other of the vibration generating portion or the vibration receiving portion;
   an elastic body that is disposed between the first mounting member and the second mounting member and is coupled to both the mounting members;
   a primary chamber constituted at an inner side of the second mounting member, the elastic body serving as a portion of a dividing wall of the primary chamber, and liquid being sealed in the primary chamber;
   a secondary chamber in which liquid is sealed, at least a portion of a dividing wall of the secondary chamber being formed by a diaphragm, and the secondary chamber being capable of expanding and contracting;
   a dividing member that divides the primary chamber from the secondary chamber, the dividing member including
      a tubular tube portion,
      a flange portion that is structured to extend to a radial direction outer side from the primary chamber side end of the tube portion, an outer periphery of the flange portion being disposed along an inner periphery of the second mounting member, and
      a movable elastic film that is disposed at the radial direction inner side of the tube portion; and
   a restriction channel member that is an annular body separate from the dividing member, that is disposed between the tube portion of the dividing member and the second mounting member in the radial direction, that includes a floor portion that is disposed apart from and opposing the flange portion and disposed within the tube portion in a tube axial direction, and that structures a restriction channel between the dividing member and the restriction channel member, the restriction channel causing fluid communication between the primary chamber and the secondary chamber, and an outer periphery end of the diaphragm being adhered to at least an inner periphery of the floor portion,
   wherein an aperture is formed in a circumferential direction portion of the floor portion of the restriction channel member, the aperture causing fluid communication between the secondary chamber and the restriction channel directly, and, at a position corresponding with the aperture, the diaphragm is adhered to the restriction channel member at the radial direction outer side relative to the aperture.

2. The vibration absorption device according to claim 1 wherein, at the restriction channel member, a channel outer tube portion that is apart from and opposes a tube portion outer face of the dividing member is structured to be continuous from an outer periphery end of the floor portion.

3. The vibration absorption device according to claim 1 wherein, at the restriction channel member, a channel inner tube portion that is disposed along the tube portion outer face of the dividing member is structured to be continuous from an inner periphery end of the floor portion.

4. The vibration absorption device according to claim 3, wherein the channel inner tube portion is extended toward the secondary chamber side from the inner periphery end of the floor portion.

5. The vibration absorption device according to claim 3 or claim 4, wherein a seal portion that covers an inner wall of the channel inner tube portion is formed integrally with the diaphragm.

6. The vibration absorption device according to claim 1, wherein the diaphragm structures the secondary chamber at the radial direction inner side relative to the inner periphery end of the floor portion, and the diaphragm is protruded to the radial direction outer side at a fluid communication position corresponding with the aperture in the floor portion.

7. The vibration absorption device according to claim 6, wherein the diaphragm is structured with a thicker thickness at the fluid communication position than at other portions of the diaphragm that structure the secondary chamber.

\* \* \* \* \*